United States Patent
Shibaki et al.

(10) Patent No.: US 8,040,565 B2
(45) Date of Patent: Oct. 18, 2011

(54) IMAGE PROCESSING DEVICE, IMAGE FORMING APPARATUS INCLUDING SAME, IMAGE PROCESSING METHOD, AND IMAGE PROCESSING PROGRAM

(75) Inventors: Hiroyuki Shibaki, Tokyo (JP); Noriko Miyagi, Kawasaki (JP)

(73) Assignee: Ricoh Company Limited, Tokyo (JP)

( * ) Notice: Subject to any disclaimer, the term of this patent is extended or adjusted under 35 U.S.C. 154(b) by 572 days.

(21) Appl. No.: 12/180,821

(22) Filed: Jul. 28, 2008

(65) Prior Publication Data

US 2009/0034002 A1 Feb. 5, 2009

(30) Foreign Application Priority Data

Jul. 31, 2007 (JP) ................ 2007-198708

(51) Int. Cl.
G06F 15/00 (2006.01)
G06K 15/02 (2006.01)
G06K 9/00 (2006.01)
G06K 9/66 (2006.01)
H04N 1/407 (2006.01)

(52) U.S. Cl. ......... 358/2.1; 358/1.9; 358/3.27; 382/118; 382/190; 382/195

(58) Field of Classification Search .................. None
See application file for complete search history.

(56) References Cited

U.S. PATENT DOCUMENTS

| | | | | |
|---|---|---|---|---|
| 4,792,847 A | * | 12/1988 | Shimazaki et al. | 358/521 |
| 5,715,377 A | * | 2/1998 | Fukushima et al. | 358/1.9 |
| 5,860,047 A | * | 1/1999 | Hernandez | 399/181 |
| 5,881,210 A | * | 3/1999 | Guay et al. | 358/1.9 |
| 6,556,707 B1 | | 4/2003 | Yagishita et al. | |
| 6,731,817 B2 | | 5/2004 | Shibaki et al. | |
| 6,987,886 B1 | | 1/2006 | Okubo et al. | |
| 7,088,472 B1 | | 8/2006 | Okubo et al. | |

(Continued)

FOREIGN PATENT DOCUMENTS

JP 8-84206 3/1996

(Continued)

OTHER PUBLICATIONS

Shinji Hayashi, et al., "Robust Face Detection for Low-Resolution Images", The Journal of the Institute of Image Electronics Engineers of Japan, vol. 34, No. 6, Nov. 2005, pp. 726-737, with English Abstract.

*Primary Examiner* — Twyler Haskins
*Assistant Examiner* — Barbara Reinier
(74) *Attorney, Agent, or Firm* — Oblon, Spivak, McClelland, Maier & Neustadt, L.L.P.

(57) ABSTRACT

An image processing device including an image signal reception unit configured to receive an image signal of an image to be processed; a density reduction area detector configured to detect a density reduction area satisfying predetermined image density reduction requirements in the image to be processed based on the image signal; a specific image area detector configured to detect a specific image area satisfying predetermined specific image requirements different from the predetermined image density reduction requirements in the image to be processed based on the image signal; and a density controller configured to reduce density of the density reduction area detected by the density reduction area detector in a non-specific image area other than the specific image area detected by the specific image area detector, and to not reduce density of the density reduction area in the specific image area.

8 Claims, 15 Drawing Sheets

U.S. PATENT DOCUMENTS

| | | |
|---|---|---|
| 7,170,642 B2 | 1/2007 | Morimoto et al. |
| 7,221,799 B2 | 5/2007 | Okubo et al. |
| 7,327,874 B2 | 2/2008 | Shibaki et al. |
| 7,355,755 B2 | 4/2008 | Suino et al. |
| 7,356,160 B2 | 4/2008 | Shibaki et al. |
| 2002/0027590 A1 | 3/2002 | Enami |
| 2003/0095287 A1* | 5/2003 | Miyagi et al. .................. 358/2.1 |
| 2003/0218776 A1 | 11/2003 | Morimoto et al. |
| 2004/0125411 A1 | 7/2004 | Tonami et al. |
| 2004/0165081 A1 | 8/2004 | Shibaki et al. |
| 2004/0179237 A1 | 9/2004 | Takenaka et al. |
| 2004/0252316 A1 | 12/2004 | Miyagi et al. |
| 2004/0257622 A1 | 12/2004 | Shibaki et al. |
| 2005/0018258 A1 | 1/2005 | Miyagi et al. |
| 2005/0018903 A1 | 1/2005 | Miyagi et al. |
| 2005/0243349 A1* | 11/2005 | Aoyama ......................... 358/1.9 |
| 2006/0238792 A1 | 10/2006 | Chang et al. |
| 2006/0279589 A1 | 12/2006 | Yasutomi et al. |
| 2007/0058188 A1 | 3/2007 | Nakahara |

FOREIGN PATENT DOCUMENTS

| | | |
|---|---|---|
| JP | 9-219790 | 8/1997 |
| JP | 11-55519 | 2/1999 |
| JP | 2001-219626 | 8/2001 |
| JP | 2005-59444 | 3/2005 |

* cited by examiner

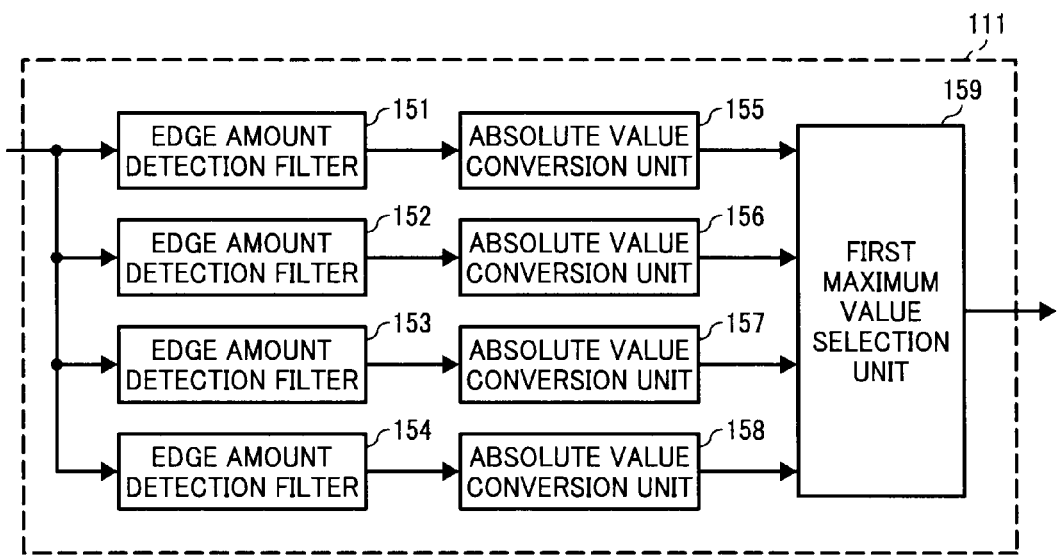

FIG. 10A CHARACTER IMAGE IN ORIGINAL DOCUMENT
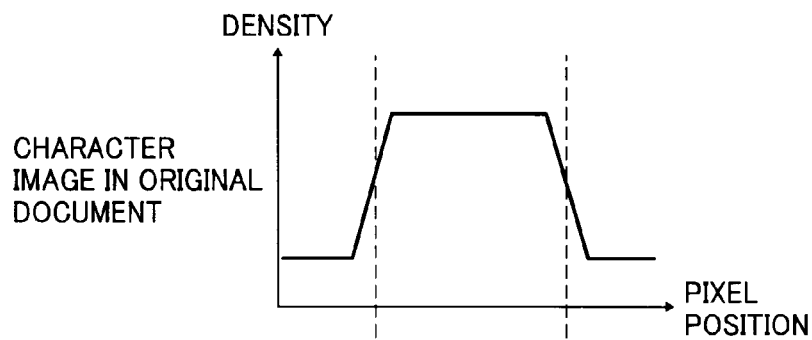
FIG. 10B MAXIMUM EDGE AMOUNT (VALUE OUTPUT FROM SECOND MAXIMUM VALUE SELECTION UNIT 112)
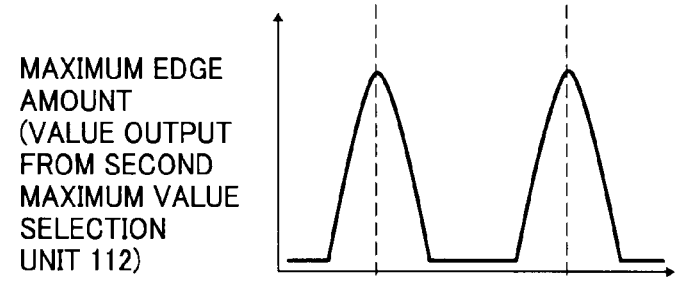
FIG. 10C LAPLACIAN VALUE (VALUE OUTPUT FROM LAPLACIAN FILTER OPERATION UNIT 115)
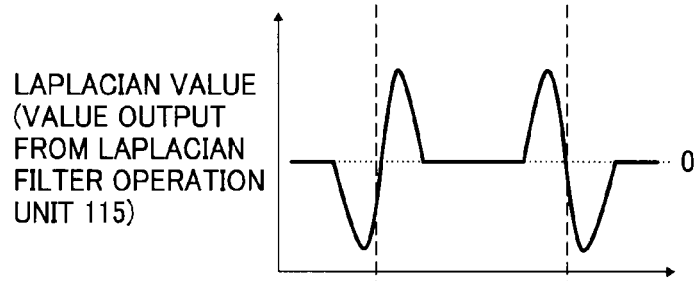
FIG. 10D eg SIGNAL (RESULT OF EDGE DETECTION)
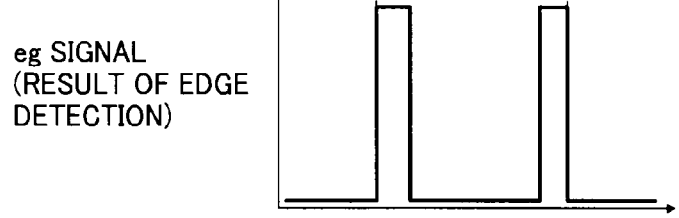

FACE IMAGE AREA

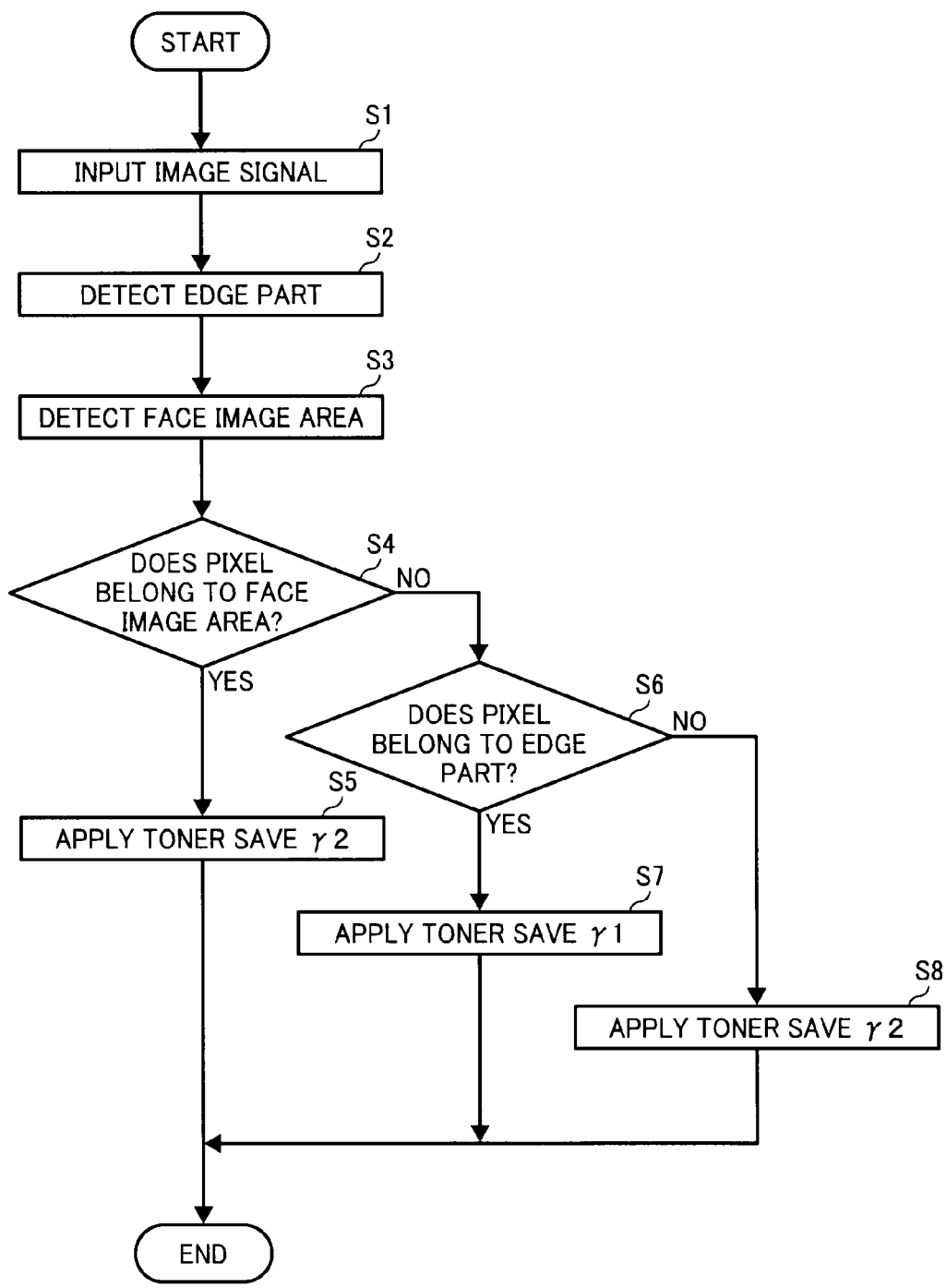

IMAGE PROCESSING DEVICE, IMAGE FORMING APPARATUS INCLUDING SAME, IMAGE PROCESSING METHOD, AND IMAGE PROCESSING PROGRAM

CROSS-REFERENCE TO RELATED APPLICATIONS

The present patent application is based on and claims priority pursuant to 35 U.S.C. §119 from Japanese Patent Application No. 2007-198708, filed on Jul. 31, 2007 in the Japan Patent Office, the entire contents of which are incorporated herein by reference.

BACKGROUND OF THE INVENTION

1. Field of the Invention

Exemplary aspects of the present invention generally relate to an image processing device, an image forming apparatus including the image processing device, an image processing method, and an image processing program.

2. Description of the Background

Related-art image forming apparatuses, such as a copier, a facsimile machine, a printer, or a multifunction printer having two or more of copying, printing, scanning, and facsimile functions, form a toner image on a recording medium (e.g., a sheet) according to image data using an electrophotographic method. In such a method, for example, a charger charges a surface of an image bearing member (e.g., a photoconductor); an optical scanning device emits a light beam onto the charged surface of the photoconductor to form an electrostatic latent image on the photoconductor according to the image data; the electrostatic latent image is developed with a developer (e.g., a toner) to form a toner image on the photoconductor; a transfer device transfers the toner image formed on the photoconductor onto a sheet; and a fixing device applies heat and pressure to the sheet bearing the toner image to fix the toner image onto the sheet. The sheet bearing the fixed toner image is then discharged from the image forming apparatus.

In addition to a normal output mode for generating and outputting a high-quality image, some of the image forming apparatuses have a toner save mode for outputting an image with a smaller amount of an image forming material such as toner and ink to reduce consumption of the image forming material compared to that in the normal output mode. Examples of methods for reducing the consumption of the image forming material include a method for forming an image after reducing the density of an input image or obtaining a logical product of a dithered image and a decimation pattern of an input image, a method for modulating a pulse width and controlling an amount of writing light when forming an image, and so forth. However, because the image is output after reducing density in the above-described methods, the quality of the output image is degraded compared to that in the normal output mode. In general, the toner save mode is used when a higher quality image is not required, for example, when checking the layout of an output image. Nevertheless, it is still desirable to improve the quality of imaging even when the toner save mode is used.

Published unexamined Japanese Patent application No. (hereinafter referred to as JP-A-) 2001-219626 discloses a print system configured to reduce toner consumption by referring to object data, such as text, graphics, and photographs, associated with an image signal of an input image. In the print system, an image part including the text, the graphics, and the photographs in the input image is specified based on the object data of the input image to reduce an amount of toner used for a part other than the image part while not reducing an amount of toner used for the image part. As a result, a certain level of legibility of the text can be maintained even though the total amount of toner used for outputting the image is reduced. However, in the print system, the above-described processing is not performed on an input image with no object data, such as a scanner image read by an image reading device. Therefore, the print system is not applicable to an image forming apparatus such as a copier, in which the image reading device is included.

In another approach, JP-A-2005-059444 discloses an image forming apparatus configured to detect an edge part in an input image such that an amount of toner used for a non-edge part in the input image is reduced while not reducing an amount of toner used for the edge part. More specifically, an edge pixel in a scanner image read by an image reading device is detected by an edge detection unit such as a Laplacian filter so that the density of the detected edge pixel is maintained and the density of a non-edge pixel is reduced to output an image. Accordingly, in the image forming apparatus, the density of the edge part is kept relatively high even though the total amount of toner used for outputting the image is reduced, so that a certain level of legibility of text is maintained by emphasizing the edge part of the text. Moreover, the problem of the print system disclosed in JP-A-2001-219626 described above can be prevented.

However, in the image forming apparatus, the above-described processing is also performed on an edge part included in an image without text, such as a photographic image. Consequently, the density of the edge part becomes relatively high while the density of a non-edge part becomes relatively low even in the image with no text. After a study performed by the inventors of the present invention, it has been found out that unnatural or odd parts may be included in the image with no text output from the image forming apparatus depending on contents of the output image.

The inventors of the present invention have studied types of images which tend to include unnatural or odd parts when consumption of an image forming material such as toner is reduced. More specifically, consumption of the image forming material is not reduced for the edge part while reducing that for the non-edge part when outputting various types of images in a similar way as the processing performed in the image forming apparatus disclosed in JP-A-2005-059444. The output images are evaluated by multiple evaluators to determine whether or not natural or odd parts are included therein.

Results of the evaluation are illustrated in FIG. 1.

After the evaluation, the inventors of the present invention have determined that a degree of unnaturalness in output images found by the multiple evaluators differs depending on the contents of the output images. For example, all of the multiple evaluators found odd parts in an image including a human face. Specifically, a higher degree of unnaturalness is found in an output image of a face image area including a face image and a surrounding image when the density of an edge part is high and that of a non-edge part is low. A degree of unnaturalness is prominent particularly in an image including a face of an acquaintance. The reason is that outlines of hair and pupils are detected as the edge part due to having higher contrast with a background image so that density thereof becomes relatively high. By contrast, a skin portion is not detected as the edge part due to having lower contrast with the background image so that density thereof becomes relatively low. Consequently, only hair and pupils are emphasized, resulting in a higher degree of unnaturalness.

On the other hand, an output image including man-made objects such as buildings and machinery has a lower degree of unnaturalness even when the density of the edge part is relatively high and that of the non-edge part is relatively low. An output image including nature such as landscape and plants also has a higher degree of unnaturalness as compared to the output image including the man-made object, although the degree of unnaturalness is lower than that in the output image of a human face.

A specific image area including a face image area and an image area having images of nature such as landscape and plants has unnatural or odd parts when the density thereof is partially reduced as well as when the density of the non-edge part is reduced while that of the edge part is not reduced.

When the edge part is detected by an edge detection filter such as a Laplacian filter as in the case of the image forming apparatus disclosed in JP-A-2005-059444, an outline of a character image having a complicated figure and a small character image may not be detected as an edge part. In addition, when contrast between a character image and an adjacent image is low, the outline of the character image may not be detected as an edge part. Particularly, for example, in a map image in which a very small character image indicating an address and a name is included and the contrast between the character image and an adjacent image is low, it is very difficult to detect the outline of the character image as an edge part. Consequently, density of the outline of a character image including a complicated figure, a small character image, and a character image having a lower contrast with the adjacent image is reduced as well as that of parts adjacent to the above-described character images even when the processing disclosed in JP-A-2005-059444 is performed, thereby degrading legibility of the character images. Particularly when the text includes a numeric image, which is unlike a character image which indicates a word of a text, it is very difficult to identify a character indicated by the numeric image by referring to the surrounding text before and after the numeric image. Moreover, in general, a numeric character in an image often includes important data. Therefore, improvement in legibility of the numeric image of which outline may not be detected as an edge part is highly desired.

SUMMARY

In view of the foregoing, exemplary embodiments of the present invention provide an image processing device capable of reducing unnatural and odd parts from an output image when the density of the output image is partially reduced so as to reduce consumption of an image forming material, and improving legibility of a character image of which the outline is not detected as an edge part. Exemplary embodiments of the present invention further provide an image forming apparatus including the image processing device, an image processing method, and an image processing program.

In one exemplary embodiment, an image processing device includes an image signal reception unit configured to receive an image signal of an image to be processed; a density reduction area detector configured to detect a density reduction area satisfying predetermined image density reduction requirements in the image to be processed based on the image signal received by the image signal reception unit; a specific image area detector configured to detect a specific image area satisfying predetermined specific image requirements different from the predetermined image density reduction requirements in the image to be processed based on the image signal received by the image signal reception unit; and a density controller configured to reduce density of the density reduction area detected by the density reduction area detector in a non-specific image area other than the specific image area detected by the specific image area detector, and to not reduce density of the density reduction area in the specific image area.

Another exemplary embodiment provides an image forming apparatus including the image processing device described above and an image forming device configured to form an image on a recording material using an image forming material based on an image signal processed by the image processing device.

Yet another exemplary embodiment provides an image processing method including receiving an image signal of an image to be processed; detecting a density reduction area satisfying predetermined image density reduction requirements in the image to be processed based on the image signal received in the receiving; detecting a specific image area satisfying predetermined specific image requirements different from the predetermined image density reduction requirements in the image to be processed based on the image signal received in the receiving; and reducing density of the density reduction area detected in the detecting the density reduction area in a non-specific image area other than the specific image area detected in the detecting the specific image area, and not reducing density of the density reduction area in the specific image area.

Yet another exemplary embodiment provides an image processing program configured to cause a computer to perform the image processing method described above.

Additional features and advantages of the present invention will be more fully apparent from the following detailed description of exemplary embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIG. 7 is a schematic view illustrating an edge amount detection unit in the edge detection unit;

FIGS. 8A to 8D are views illustrating four types of filters used as edge amount detection filters of the edge amount detection unit;

FIG. 9 is a view illustrating a filter used in a Laplacian filter operation unit of the edge amount detection unit;

FIGS. 10A to 10D are views illustrating edge detection of a character image in an original document;

FIG. 20 is a flow chart illustrating a flow of software processing performed in an image processing unit according to a fourth exemplary embodiment.

DETAILED DESCRIPTION OF EXEMPLARY EMBODIMENTS

Figure 1:
FIG. 1 is a graph illustrating a result of an evaluation performed by multiple evaluators to study a degree of unnaturalness found in various types of output images.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Exemplary embodiments of the present invention are now described below with reference to the accompanying drawings.

In a later-described comparative example, exemplary embodiment, and exemplary variation, for the sake of simplicity the same reference numerals will be given to identical constituent elements such as parts and materials having the same functions, and redundant descriptions thereof omitted unless otherwise stated.

Typically, but not necessarily, paper is the medium from which is made a sheet on which an image is to be formed. It should be noted, however, that other printable media are available in sheets, and accordingly their use here is included. Thus, solely for simplicity, although this Detailed Description section refers to paper, sheets thereof, paper feeder, etc., it should be understood that the sheets, etc., are not limited only to paper but includes other printable media as well.

A description is now given of exemplary embodiments of a tandem type color laser composite machine using electrophotography (hereinafter simply referred to as image forming apparatus) in which multiple latent image bearing members each serving as a photoconductor are arranged parallel to one another.

The image forming apparatus according to the exemplary embodiments is a composite machine including a copier and a printer configured to form an image based on image data read by a scanner and sent from an external device such as a personal computer. Needless to say, the present invention is also applicable to other image forming apparatuses, including, but not limited to, a copier, a printer, and a facsimile machine.

Figure 2:
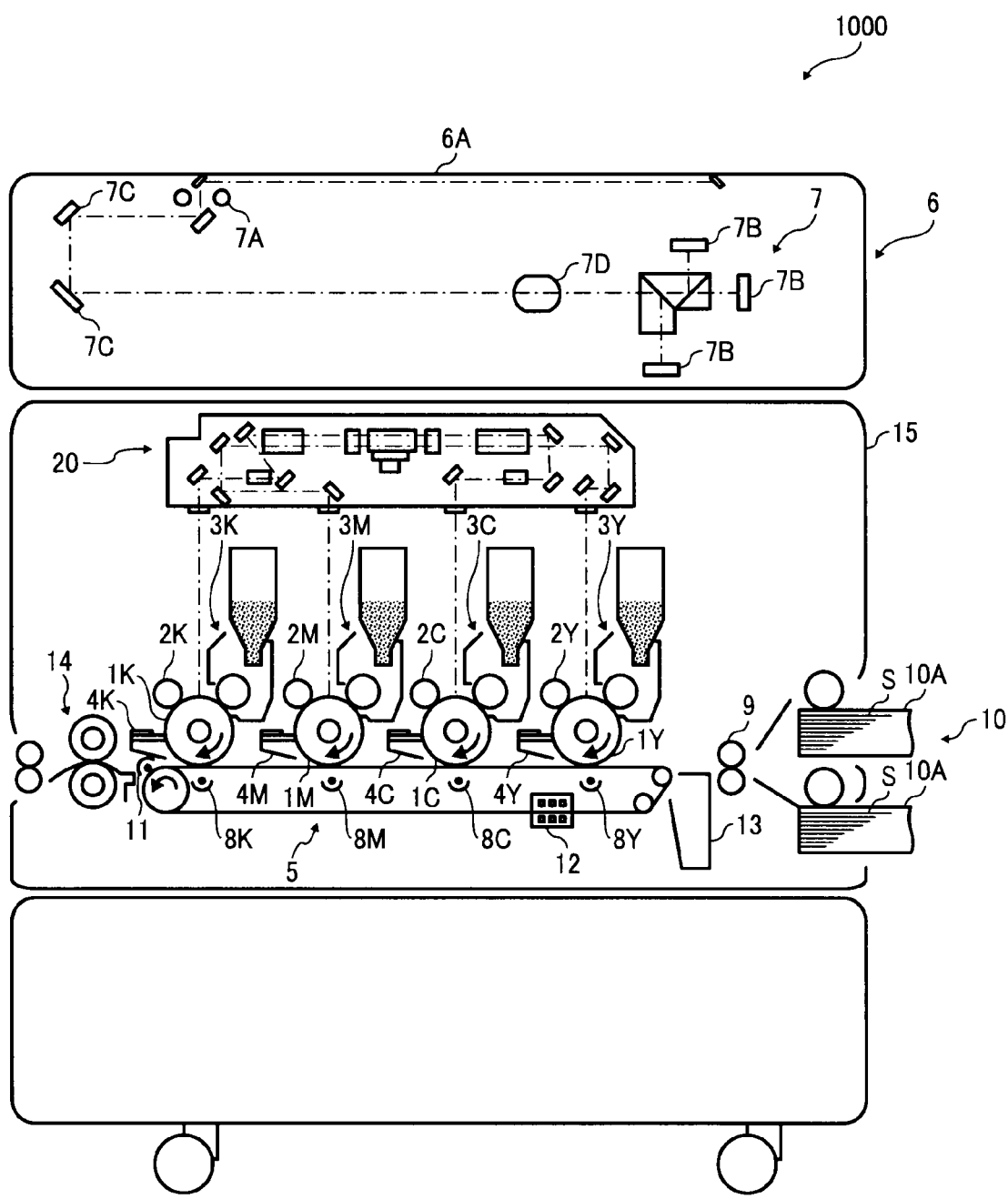
FIG. 2 is a schematic view illustrating a configuration of an image forming apparatus according to exemplary embodiments.

FIG. 2 is a schematic view illustrating a configuration of the image forming apparatus according to the exemplary embodiments.

An image forming apparatus 1000 forms an image on a transfer sheet S such as an OHP sheet, heavy paper including a card and a post card, and an envelope, as well as plain paper generally used for copying. The image forming apparatus 1000 mainly includes a scanner 6 and a printer 15.

The printer 15 has a tandem configuration in which multiple photoconductors 1Y, 1C, 1M, and 1K (hereinafter collectively referred to as photoconductors 1) respectively corresponding to colors of yellow (Y), cyan (C), magenta (M), and black (K) configured to form images of each color are provided parallel to one another. The images of each color respectively formed on the photoconductors 1 are transferred onto the transfer sheet S conveyed by a transfer belt 5 serving as a movable recording medium conveyance member facing the photoconductors 1.

Image formation performed in the image forming apparatus 1000 is described in detail below by taking the photoconductor 1Y and components provided around the photoconductor 1Y illustrated in FIG. 2 as a representative example. The photoconductors 1C, 1M, and 1K and components provided around the photoconductors 1C, M, and 1K respectively have the same configuration as that of the photoconductor 1Y and the components provided around the photoconductor 1Y. Therefore, for convenience, reference numerals corresponding to reference numerals assigned to the photoconductor 1Y and the components provided around the photoconductor 1Y are assigned to the photoconductors 1C, 1M, and 1K and the components provided around the photoconductors 1C, 1M, and 1K, and detailed descriptions thereof are omitted.

A charger 2Y including a charging roller, an optical scanning device 20 serving as a latent image forming unit configured to direct laser light from a laser light source to a surface of the photoconductor 1Y to scan the surface of the photoconductor 1Y, a developing device 3Y, and a cleaning device 4Y are provided around the photoconductor 1Y along a rotation direction of the photoconductor 1Y as indicated by an arrow in FIG. 2 to form an image. The configuration and operation of the optical scanning device 20 are described in detail later.

Developing devices 3Y, 3C, 3M, and 3K (hereinafter collectively referred to as developing devices 3) are provided as illustrated in FIG. 2 so that toner colors of yellow, cyan, magenta, and black are respectively supplied, in that order, from a right side of an extended part of the transfer belt 5. Although the charger 2Y illustrated in FIG. 2 includes a charging roller, alternatively a corona discharge method using a discharge wire may be used for charging the surface of the photoconductor 1Y.

In the image forming apparatus 1000, the scanner 6 is provided above the printer 15 including the charger 2Y, the optical scanning device 20, the developing device 3Y, the cleaning device 4Y, and so forth. In the scanner 6, image data of an original document placed on an original document stand 6A is read by an image reading device 7. The image data thus read is output to an image processing device, not shown, to obtain data to be written to the optical scanning device 20.

The image reading device 7 includes a light source 7A configured to scan the original document placed on the original document stand 6A, and multiple reflection mirrors 7C and an imaging lens 7D, each of which are configured to provide an image to multiple CCDs 7B provided corresponding to each color of reflected light from the original document. Image data corresponding to the intensity of the reflected light of each color is output from each of the multiple CCDs 7B to the image processing device. Configuration and operation of the image processing device are described in detail later.

The transfer belt 5 provided in the printer 15 is a belt-type derivative including a polyester film extended around multiple rollers. A portion of the extended part of the transfer belt 5 faces each of the photoconductors 1Y, 1C, 1M, and 1Y, and transfer devices 8Y, 8C, 8M, and 8K (hereinafter collectively referred to as transfer devices 8) are respectively provided opposite the photoconductors 1Y, 1C, 1M, and 1K with the transfer belt 5 therebetween. The transfer sheet S is fed from a paper feed cassette 10A of a paper feed device 10 to the transfer belt 5 via a registration roller 9. The transfer sheet S thus fed is electrostatically attracted to the transfer belt 5 by a corona discharge from the transfer devices 8 and conveyed. Images carried by the photoconductors 1 are electrostatically attracted to the transfer sheet S by a positive corona discharge from the transfer devices 8.

A neutralizing device 11 configured to neutralize the transfer sheet S is provided at a position through which the transfer sheet S having the images transferred from the photoconductors 1 thereon passes. Neutralizing devices 12 configured to neutralize the transfer belt 5 are provided facing each other with the transfer belt 5 therebetween, at the other extended part of the transfer belt 5. In FIG. 2, reference numeral 13 denotes a cleaning device configured to remove toner particles from the transfer belt 5. The neutralizing device 11 performs negative AC corona discharge from an upper surface of the transfer sheet S so as to neutralize electric charges on the transfer sheet S and release the transfer sheet S electrostatically attracted to the transfer belt 5 from the transfer belt 5. Accordingly, the transfer sheet S is separated from the transfer belt 5 by a curvature of the transfer belt 5, and simultaneously, scattering of toner caused by separation discharge, which occurs when removing the transfer sheet S from the transfer belt 5, can be prevented. The neutralizing devices 12 apply a negative AC corona discharge having a polarity opposite that of the charge applied from the transfer devices 8 to the transfer belt 5 from both front and back surfaces thereof, so that electric charges on the transfer belt 5 are electrically neutralized and the transfer belt 5 is prepared for a subsequent image forming operation.

A surface of each of the photoconductors 1Y, 1C, 1M, and 1K is evenly charged by each of chargers 2Y, 2C, 2M, and 2K (hereinafter collectively referred to as chargers 2). Subsequently, electrostatic latent images are formed on the photoconductors 1 by the optical scanning device 20 based on the image data for each color read by the image reading device 7. The electrostatic latent images thus formed are developed with toner of each color supplied from developing devices 3Y, 3C, 3M, and 3K. Thereafter, the transfer devices 8 electrostatically transfer toner images of each color onto the transfer sheet S conveyed by the transfer belt 5.

The transfer sheet S having the toner images of each color thereon is neutralized by the neutralizing device 11, and is separated from the transfer belt 5 using the curvature of the transfer belt 5. Subsequently, the transfer sheet S is conveyed to a fixing device 14 to fix the toner images on the transfer sheet S. Thereafter, the sheet S having the fixed toner image thereon is discharged to a discharge tray, not shown, attached to a main body of the image forming apparatus 1000.

Figure 3:
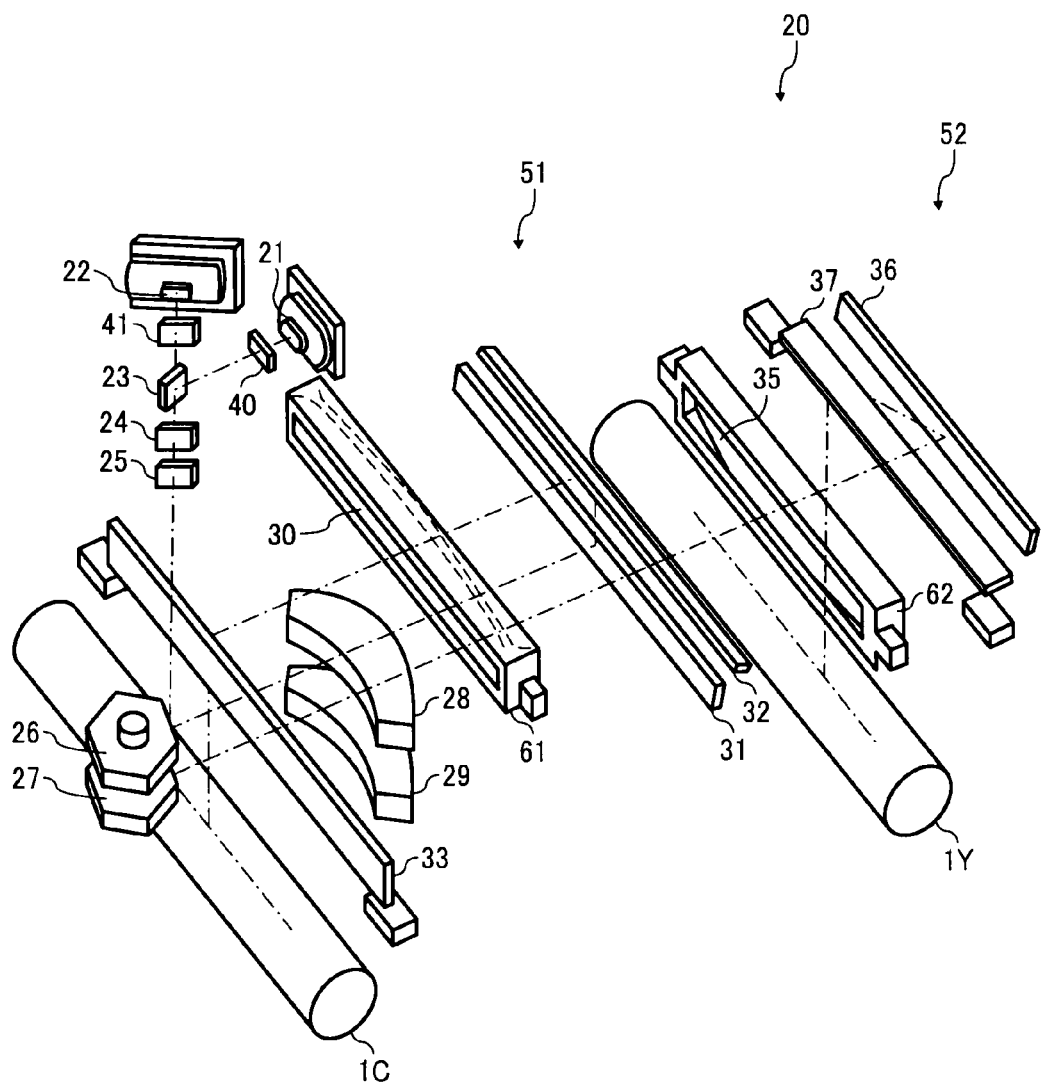
FIG. 3 is a perspective view illustrating a configuration of an optical scanning device in the image forming apparatus.

FIG. 3 is a perspective view illustrating a configuration of the optical scanning device 20.

Although the optical scanning device 20 according to the exemplary embodiments employs optical lenses, optical mirrors may be alternatively used. The optical scanning device 20 has a substantially symmetrical configuration with polygon mirrors 26 and 27 each serving as a deflection unit at a center thereof. Therefore, for convenience, only half of the optical scanning device 20 having the polygon mirrors 26 and 27 at the center thereof is illustrated in FIG. 3 and described in detail below.

The optical scanning device 20 includes LD units 21 and 22 each having a laser light emitting element LD serving as a light source. The LD units 21 and 22 receive pulsed drive signals corresponding to image data output from the image processing device, and emit intermittent laser beams to the photoconductors 1Y and 1C to form dot latent images on the photoconductors 1Y and 1C. The optical scanning device 20 forms an image of the laser beams emitted from each of the LD units 21 and 22 on each of the photoconductors 1Y and 1C. Therefore, the optical scanning device 20 further includes optical element groups 51 and 52, each having multiple optical elements, respectively corresponding to the LD units 21 and 22 and the photoconductors 1Y and 1C. In other words, the optical scanning device 20 is provided corresponding to each of the photoconductors 1Y and 1C.

The optical element group 51 includes multiple optical elements including a prism 40, a return mirror 23, a cylinder lens 24, a polygon mirror 26, a first scanning lens 28, return mirrors 31 and 32, a second scanning lens 30, and a return mirror 33. The optical element group 52 includes multiple optical elements including a prism 41, a cylinder lens 25, a polygon mirror 27, a first scanning lens 29, a second scanning lens 35, and return mirrors 36 and 37.

The optical scanning device 20 further includes a holding member 61 for holding the second scanning lens 30 of the optical element group 51, and a holding member 62 for holding the second scanning lens 35 of the optical element group 52. A configuration of the holding member 61 and the second scanning lens 30 held by the holding member 61 is substantially the same as that of the holding member 62 and the second scanning lens 35 held by the holding member 62.

Each of the LD units 21 and 22 is provided at a different height from each other in a vertical direction. The light beam emitted from the LD unit 21 provided at a higher position passes through the prism 40 serving as a writing start position correction unit. Subsequently, the light beam is bent by the return mirror 23 in a direction identical to a direction of the light beam emitted from the LD unit 22 provided at a lower position. The light beam emitted from the LD unit 22 passes through the prism 41 serving as a writing start position correction unit before entering the return mirror 23, and subsequently, passes through the return mirror 23. Thereafter, the light beam emitted from the LD unit 21 and the light beam emitted from the LD unit 22 enter the cylinder lenses 24 and 25, respectively, and are focused in the vicinity of reflection surfaces of the polygon mirrors 26 and 27, respectively. The polygon mirrors 26 and 27 are provided a predetermined distance apart in a vertical direction.

The light beams deflected by the polygon mirrors 26 and 27 are shaped by the first scanning lenses 28 and 29, respectively. The first scanning lenses 28 and 29 are either integrally formed or superimposed on each other. Thereafter, the second scanning lenses 30 and 35 shape the light beams to have fθ characteristics and a predetermined spot diameter, and the light beams thus shaped scan the surfaces of the photoconductors 1Y and 1C, respectively. After passing through the first scanning lenses 28 and 29, optical paths of the light beams differ from each other such that the light beams are guided to the photoconductors 1Y and 1C, respectively.

The light beam passing through the first scanning lens 28 provided at an upper position is bent by the return mirrors 31 and 32, and subsequently enters the second scanning lens 30 including a long plastic lens. Thereafter, the light beam is bent vertically downward so as to scan the surface of the photoconductor 1C in a main scanning direction.

The light beam passing through the first scanning lens 29 provided at an lower position enters the second scanning lens 35 including a long plastic lens without entering a return mirror. Thereafter, an optical path of the light beam is bent by the return mirrors 36 and 37 so as to scan the surface of the photoconductor 1Y in a main scanning direction.

In the optical scanning device 20 having the above-described configuration, the pulsed laser beams corresponding to the image data output from the image processing device emitted from the LD units 21 and 22 scan the surfaces of the photoconductors 1Y and 1C, respectively, so that dot latent images are formed on the surfaces of the photoconductors 1Y and 1C, respectively.

A description is now given of the configuration and operation of the image processing device.

The image processing device according to the exemplary embodiments includes an image processing unit configured to process image data read by the image reading device 7 in the scanner 6, and an image processing unit configured to process image data sent from an external device such as a personal computer. Each of the image processing units is independently formed as a module. Since the present invention is applicable to both of the image processing units in a similar manner, only the configuration and operation of the former image processing unit is described in detail below. In the description below, a pixel value is represented by integers from 0 to 255, in which 0 represents the lowest density and 255 represents the highest density.

In the exemplary embodiments, a user operates an operation panel, not shown, provided on an outer surface of the image forming apparatus 1000 so that either a normal output mode or a toner save mode is selected. In the toner save mode, images are output with a smaller amount of toner, thereby reducing toner consumption. Moreover, the user may select a type of an original document to be printed by operating the operation panel. Accordingly, operations of image processing and image formation may be appropriately changed in accordance with the type of the original document selected by the user. In the exemplary embodiments, one of "text/photographic document", "text document", "photographic document", and "map document" can be selected as a type of the original document by the user. Alternatively, the type of the original document may be determined automatically.

A first exemplary embodiment of the image forming processing unit is described in detail below.

Figure 4:
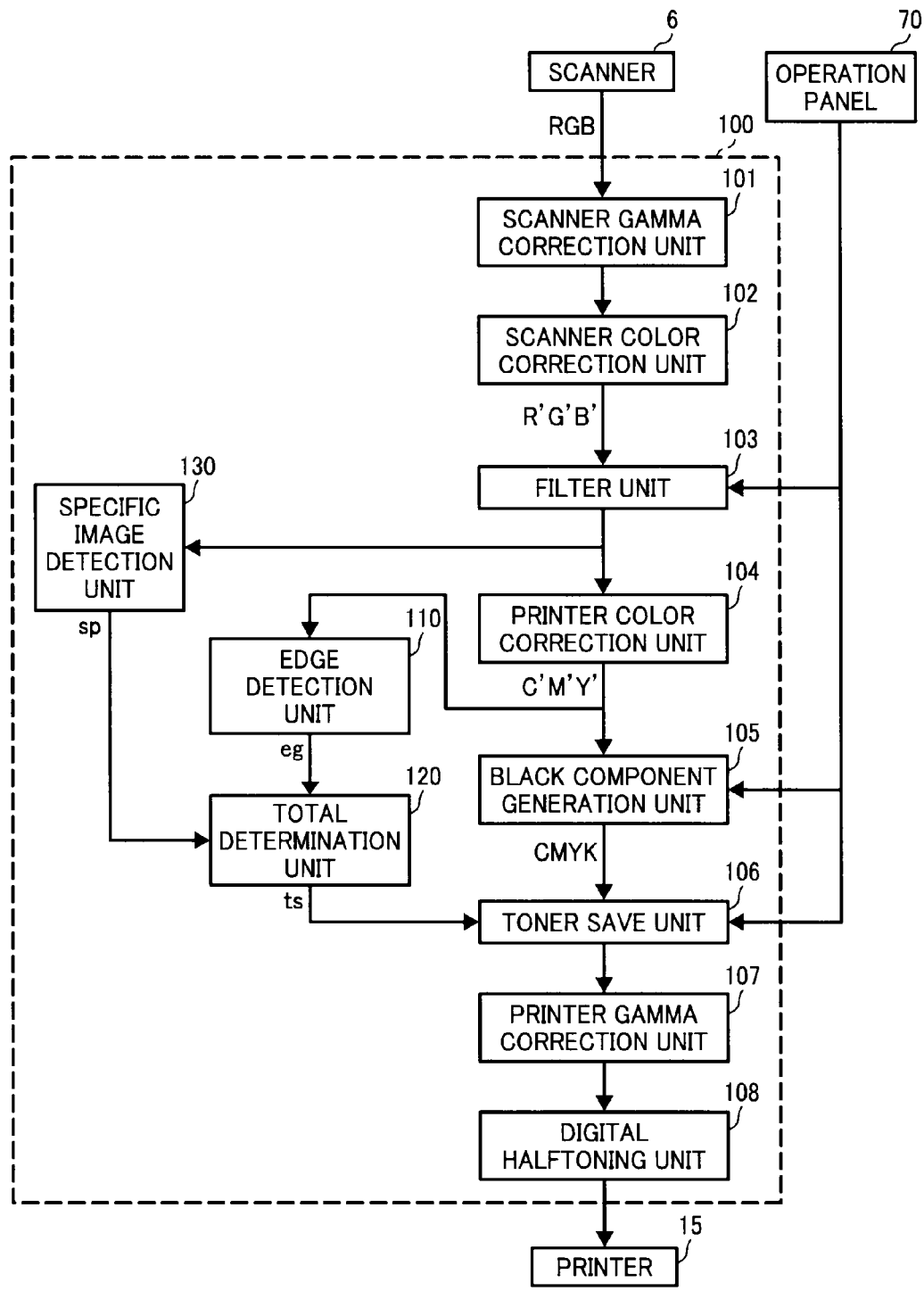
FIG. 4 is a schematic view illustrating main components of an image processing unit according to a first exemplary embodiment.

FIG. 4 is a schematic view illustrating main components of an image processing unit 100 according to the first exemplary embodiment.

Image data read by the image reading device 7 in the scanner 6 is output to a scanner gamma correction unit 101 of the image processing unit 100 as image signals of the colors red (R), green (G), and blue (B) (hereinafter referred to as R, G, and B signals, respectively). The scanner gamma correction unit 101 performs gamma correction specific to the image reading device 7 to convert the R, G, and B signals from a reflectance-linear signal into a density-linear signal, and outputs the R, G, and B signals thus converted to a scanner color correction unit 102.

The scanner color correction unit 102 converts the R, G, and B signals which are device-dependent, that is, depend on characteristics of the image reading device 7, into R', G', and B' signals which are device-independent, that is, do not depend on the characteristics of any device, and outputs the R', G', and B' signals to a filter unit 103.

The filter unit 103 performs smoothing and edge emphasis on the R', G', and B' signals so as to prevent moiré by suppressing irregularities at a halftone dot part and enhance sharpness of any text parts in the image. Thereafter, the filter unit 103 outputs the resultant R', G', and B' signals to a printer color correction unit 104. A degree of the above-described processing can be changed depending on a type of the original document selected by the user through the operation panel 70. Specifically, edges are highly emphasized to enhance sharpness of the text parts when the "text document" and the "map document" are selected by the user. In contrast, the image is highly smoothened to prevent moiré when the "photographic document" is selected. Meanwhile, when the "text/photographic document" is selected, edges are emphasized and the image is smoothed to an intermediate degree.

The printer color correction unit 104 converts the R', G', and B' signals that are device-independent into C', M', and Y' signals which do depend on characteristics of the printer 15, and outputs the C', M', and Y' signals to a black component generation unit 105 and an edge detection unit 110.

The black component generation unit 105 generates a K signal based on the C', M', and Y' signals in a process called black component generation, and removes undercolor by reducing amounts of each of the C', M', and Y' signals based on the K signal in a process called undercolor removal (UCR) to generate C, M, Y, and K signals. The C, M, Y, and K signals thus generated correspond to each color of toner in the printer 15, and are output to a toner save unit 106.

A description is now given of processing performed in the black component generation unit 105.

Figure 5:
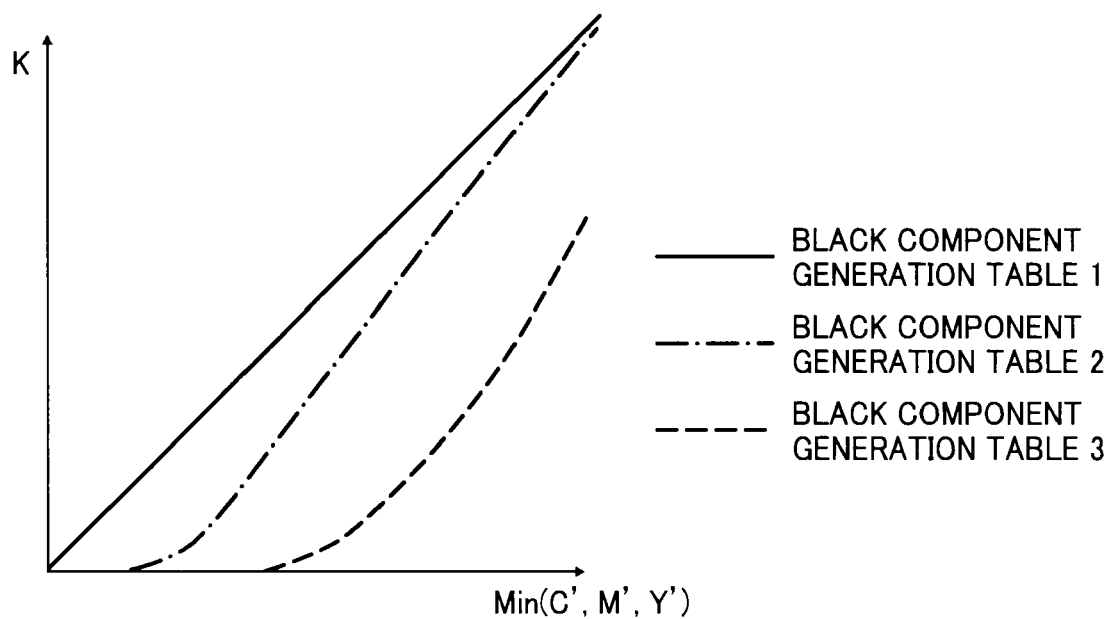
FIG. 5 is a graph illustrating a lookup table (LUT) for black component generation.

FIG. 5 is a graph illustrating a lookup table (LUT) for black component generation.

Although black component generation and undercolor removal may be performed using either an arithmetic expression or the LUT, black component generation is performed using the LUT and undercolor removal is performed using the arithmetic expression in the first exemplary embodiment. In black component generation, a minimum value Min(C', M', Y') of the C', M', and Y' signals is calculated to obtain an output value corresponding to the minimum value Min(C', M', Y') by referring to the LUT. Meanwhile, undercolor removal is performed using arithmetic expressions (1) to (3) described below, where "α" represents a UCR adjustment parameter.

$$C = C' - \alpha \times K \quad (1)$$

$$M = M' - \alpha \times K \quad (2)$$

$$Y = Y' - \alpha \times K \quad (3)$$

The above-described processing may be changed based on the type of original document selected by the user through the operation panel 70. Specifically, a black component generation table 1 is used when "text document" or "map document" is selected so that the minimum value Min(C', M', Y') is replaced with the K signal and the UCR adjustment parameter α is set to 1. When the "photographic document" is selected, a black component table 3 is used to gradually generate the K signal from a halftone without generating the K signal at highlights. In this case, the UCR adjustment parameter α is set to 0.5. Meanwhile, when the "text/photographic document" is selected, a black component table 2 is used to generate a larger amount of the K signal as compared to the case in which the "photographic document" is selected, and the UCR adjustment parameter α is set to 0.8.

In the first exemplary embodiment, edge detection is performed based on the C', M', and Y' signals generated by the printer color correction unit 104, and density is reduced based on the detection result. Such processing is described in detail below.

Figure 6:
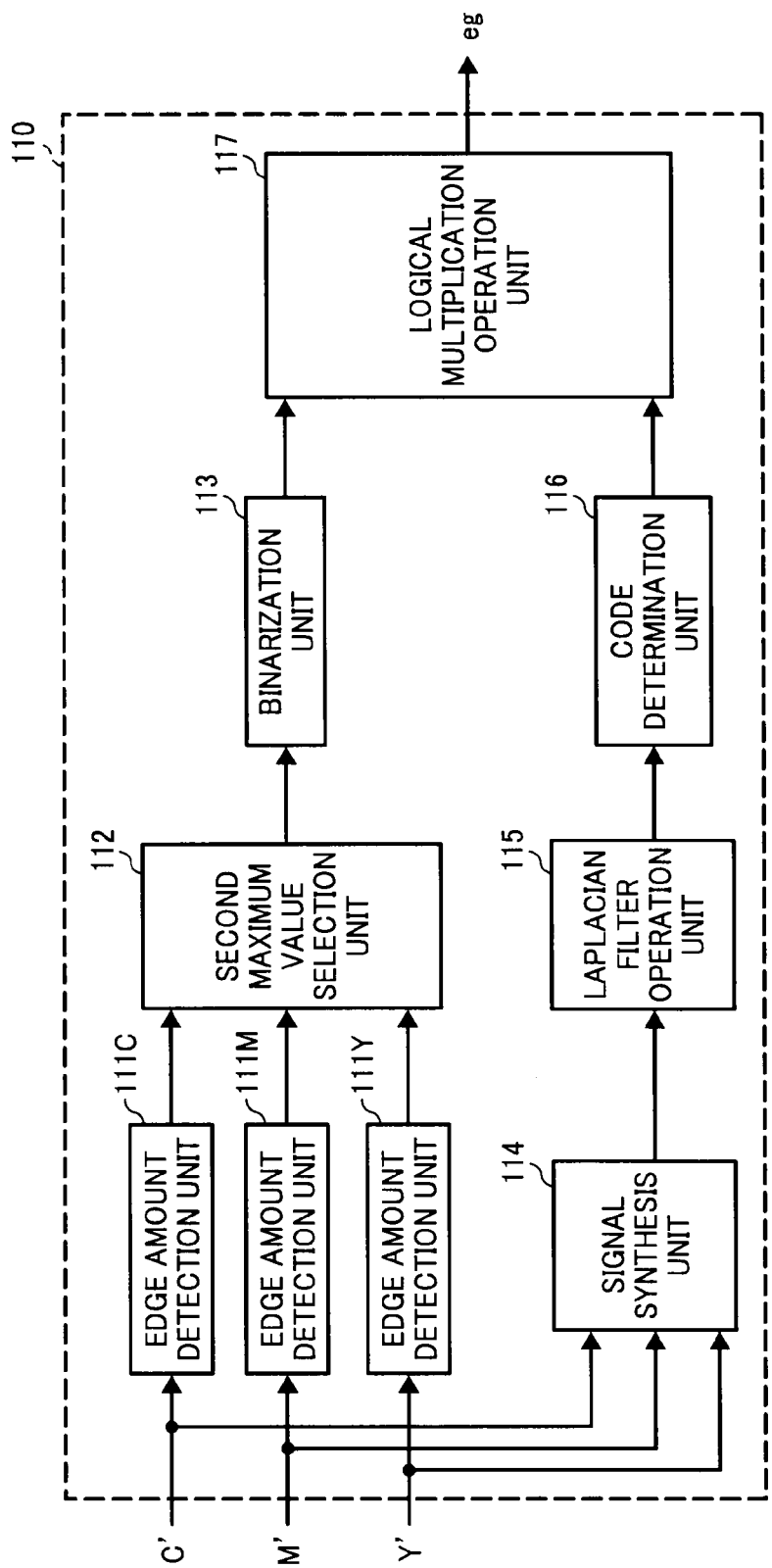
FIG. 6 is a schematic view illustrating a configuration of an edge detection unit in the image processing unit.

FIG. 6 is a schematic view illustrating a configuration of the edge detection unit 110. FIG. 7 is a schematic view illustrating a configuration of edge amount detection units 111C, 111M, and 111Y (hereinafter collectively referred to as edge amount detection units 111) in the edge detection unit 110.

The edge detection unit 110 detects an area of which the density is to be reduced. Each of the edge amount detection units 111C, 111M, 111Y of the edge detection unit 110 detects an amount of multivalued edge for each of the C', M', and Y' signals. Specifically, the edge amount detection filters 151 to 154 illustrated in FIG. 7 perform masking operations by using four types of 7×7 filters illustrated in FIGS. 8A to 8D, respectively. Thereafter, each of output values from the edge amount detection filters 151 to 154 is converted into an absolute value by each of absolute value conversion units 155 to 158. A first maximum value selection unit 159 selects a maximum absolute value from among the four absolute values thus converted to output as an edge amount to a second maximum value selection unit 112.

The second maximum value selection unit 112 selects a maximum edge amount among the edge amounts of each color output from each of the edge amount detection unit 111C, 111M, and 111Y. The maximum edge amount thus selected is output to a binarization unit 113. The binarization unit 113 compares the maximum edge amount with a preset threshold, and outputs either 1 when the maximum edge amount is greater than the threshold or 0 when the maximum edge amount is smaller than the threshold.

Meanwhile, the C', M', and Y' signals input in the edge detection unit 110 are added together at a predetermined ratio in a signal synthesis unit 114 and synthesized into a single signal. More specifically, the signal synthesis unit 114 performs an operation of, for example, (C'×¼+M'×2/4+Y'×¼), and outputs a resultant signal to a Laplacian filter operation unit 115 as a synthesized signal. The Laplacian filter operation unit 115 performs a masking operation on the synthesized signal by using a filter illustrated in FIG. 9, and outputs a resultant value to a code determination unit 116. The code determination unit 116 determines whether or not the value input from the Laplacian filter operation unit 115 is a positive value or a negative value, and outputs 1 when the value is positive and 0 when the value is negative.

A logical multiplication operation unit 117 performs logical multiplication on the output values from the binarization unit 113 and the code determination unit 116, and outputs either 1, indicating an edge part as an eg signal when a resultant value is 1 or 0 as an eg signal when the resultant value is not 1. The eg signal is output to a total determination unit 120 to be described in detail later.

FIGS. 10A to 10D are views illustrating edge detection of a character image in an original document to be processed.

When an original document illustrated in FIG. 10A is subjected to edge detection, first, the second maximum value selection unit 112 outputs the maximum edge amount as a positive value as illustrated in FIG. 10B. Next, the Laplacian filter operation unit 115 outputs Laplacian values such that a portion with higher density (inner portion of the character image) in the edge area of the character image becomes positive, and a portion with a lower density (outer portion of the character image) becomes negative, as illustrated in FIG. 10C. In the first exemplary embodiment, an edge part is detected based on not only the maximum edge amount output from the second maximum value selection unit 112 but also a code determined based on the Laplacian value. Accordingly, the inner portion of the character image in the edge area where the Laplacian value becomes positive is detected as an edge part, while the outer portion of the character image in the edge area where the Laplacian value becomes negative is not detected as an edge part as illustrated in FIG. 10D.

A description is now given of detection of a specific image area in which a specific image such as a face image is included. Although the first exemplary embodiment describes a case in which the specific image is a face image, the specific image is not particularly limited to the face image as long as an image has any unnatural or odd parts when the density of the image is partially reduced.

Figure 11:
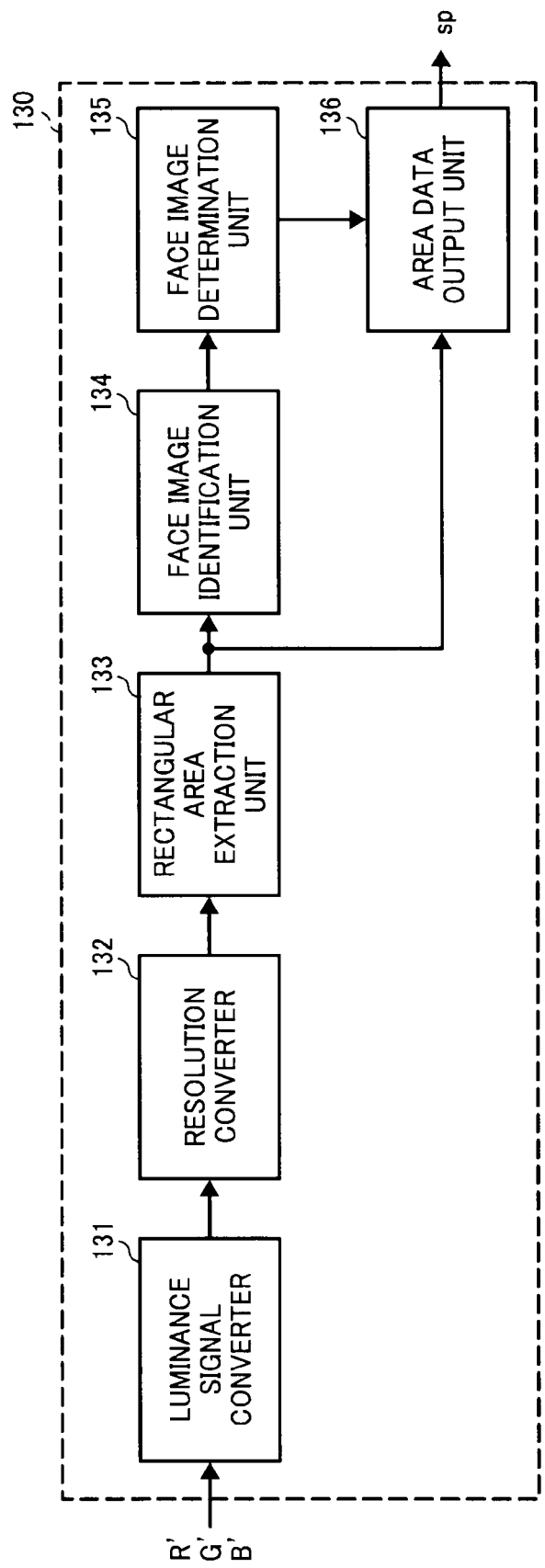
FIG. 11 is a schematic view illustrating a specific image detection unit in the image processing unit.

FIG. 11 is a schematic view illustrating a configuration of a specific image detection unit 130 according to the first exemplary embodiment.

The specific image detection unit 130 detects a specific image area. Specifically, the specific image detection unit 130 detects a face image based on AdaBoost. In the specific image detection unit 130, a luminance signal converter 131 converts the R', G', and B' signals output from the filter unit 103 into luminance signals, and outputs the luminance signals to a resolution converter 132. The conversion is performed based on an operational expression (4) described below.

$$Y=(R'+2G'+B')/4 \qquad (4)$$

The resolution converter 132 converts resolutions of the luminance signals, and outputs the luminance signals, of which resolutions are converted, to a rectangular area extraction unit 133. In the first exemplary embodiment, the resolutions of the luminance signals are converted into multiple one-half resolutions (2×2 pixels, skipping every other pixel) in each of a main scanning direction and a sub-scanning direction, or one-quarter resolutions in both the main scanning direction and the sub-scanning direction simultaneously.

The rectangular area extraction unit 133 extracts a rectangular area from the luminance signal, of which resolution is thus converted. In the first exemplary embodiment, a rectangular area of 24 by 24 pixels is extracted from the luminance signal and is output to a face image identification unit 134.

Figure 12:
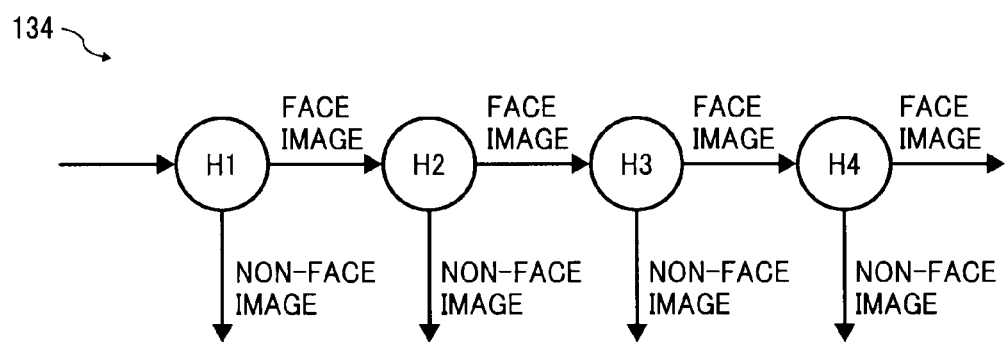
FIG. 12 is a schematic view illustrating a configuration of a face image identification unit in the specific image detection unit.
Figure 13A:
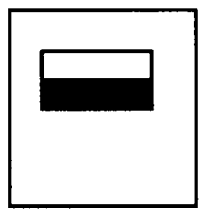
FIGS. 13A to 13D are views illustrating characteristic quantity calculation filters respectively used in four identifiers in the face image identification unit.
Figure 13B:
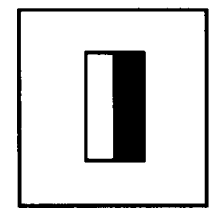
Figure 13C:
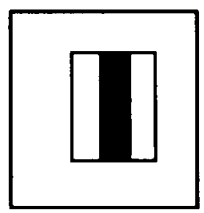
Figure 13D:
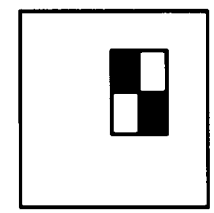

The face image identification unit 134 identifies whether or not the rectangular area of the luminance signal includes a face image. Specifically, the face image identification unit 134 using AdaBoost has a cascade configuration, in which multiple identifiers H1 to H4 are included as illustrated in FIG. 12. Only when all of the multiple identifiers H1 to H4 determine that the rectangular area includes a face image, an image is identified as a face image. The identifiers H1 to H4 identify whether or not the rectangular area includes a face image by using characteristic quantity calculation filters each having a simple configuration as illustrated in FIGS. 13A to 13D. In FIGS. 13A to 13D, a white portion represents a white pixel, and a black portion represents a black pixel. More specifically, the identifier H1 employs a filter illustrated in FIG. 13A to obtain total pixel values of each of a white pixel area and a black pixel area in a rectangular area of 24 by 24 pixels, and a difference value therebetween.

Thereafter, the identifier H1 determines whether or not the difference value satisfies certain requirements set by the user. When the difference value satisfies the requirements, identification is further performed by the identifier H2. On the other hand, when the difference value does not satisfy the requirements, the identifiers H1 determines that the rectangular area does not include a face image, and the identification process is terminated. The identifiers H2 to H4 sequentially perform identification by using the character quantity calculation filters illustrated in FIGS. 13B to 13D, respectively. When the identifier H4 determines that the rectangular area includes a face image, it means that all of the identifiers H1 to H4 determine that the rectangular area includes a face image, so that a face image determination unit 135 determines that the rectangular area of 24 by 24 pixels includes a face image. When the identification is performed by using AdaBoost, data on a large number of face images and non-face images needs to be studied in advance to set the requirements and adjust the filters such that each of the identifiers H1 to H4 reliably identifies a face image.

When the face image determination unit 135 determines that the rectangular area includes a face image as described above, an area data output unit 136 outputs an sp signal including data about the rectangular area such as coordinate data to specify the rectangular area. The face image area specified by the sp signal is, for example, an area circumscribed by a dotted line in an original document illustrated in FIG. 14.

Because conversion into a lower resolution performed by the resolution converter 132 and extraction of the rectangular area performed by the rectangular area extraction unit 133 need to be performed for all areas of the original document, a series of processes performed by the specific image detection unit 130 described above needs to be repeatedly performed. Therefore, the above-described processes are preferably implemented using software.

Detection of a face image by using AdaBoost is described in detail in "Robust Face Detection for Low-Resolution Images" in the Journal of the Institute of Image Electronics Engineers of Japan 2005/11, Vol. 34, No. 6 (178), and therefore a further and more detailed description thereof is omitted here.

Figures 14, 15:
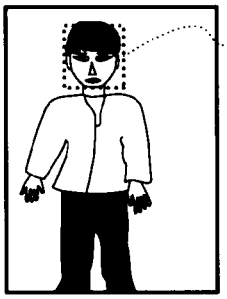
FIG. 14 is a view illustrating an example of an original document.
FIG. 15 is a view in which only pixels in the original document detected as an edge part by the edge detection unit are shown.

Referring back to FIG. 4, the sp signal is output to the total determination unit 120 in a similar way as the eg signal. The total determination unit 120 outputs an edge determination signal ts indicating a total determination result based on the eg signal from the edge detection unit 110 and the sp signal from the specific image detection unit 130. Specifically, when the edge detection unit 110 performs edge detection on the original document illustrated in FIG. 14, for example, a detection result like that illustrated in FIG. 15 is obtained. FIG. 15 illustrates a view in which only pixels detected as an edge part by the edge detection unit 110 in the original document illustrated in FIG. 14 are shown. As illustrated in FIG. 15, an outer edge of a character image is detected as an edge part, and a portion having a higher contrast in a photographic image circumscribed by a solid line at a lower right part in FIG. 14 is also detected as an edge part. More specifically, in the photographic image, outlines of pupils and hair of a person and an outline of clothes having higher density are detected as an edge part.

Figure 16:
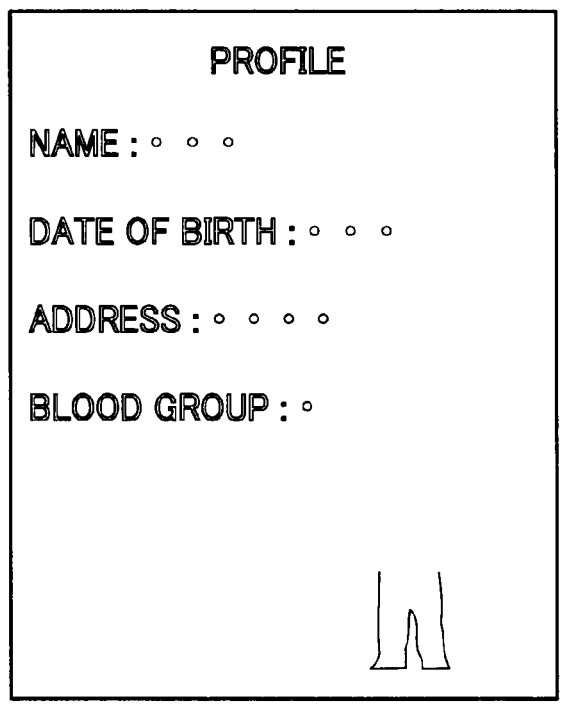
FIG. 16 is a view in which only pixels in the original document detected as an edge part by a total determination unit after consideration of a recognition result of a face image area are shown.

As described above, when the density of the face image area including a face image is partially reduced, an output image thereof tends to have unnatural or odd parts. To solve such a problem, according to the first exemplary embodiment, the total determination unit 120 is configured not to determine the edge part specified by the eg signal from the edge detection unit 110 as an edge part in the face image area specified by the sp signal from the specific image detection unit 130. In other words, pixels in the face image area are not determined as an edge part even when the pixels are detected as an edge part by the edge detection unit 110. Thereafter, the edge determination signal ts thus determined by the total determination unit 120 is output to a toner save unit 106. Pixels determined as an edge part specified by the edge determination signal ts are illustrated in FIG. 16.

A description is now given of toner saving performed by the toner save unit 106.

The toner save unit 106 performs toner saving when the user selects a toner save mode. More specifically, when the user selects the toner save mode, the toner save unit 106 switches a type of the toner save mode based on a document type signal indicating the type of an original document from the operation panel 70, and the edge determination signal ts from the total determination unit 120.

Figure 17:
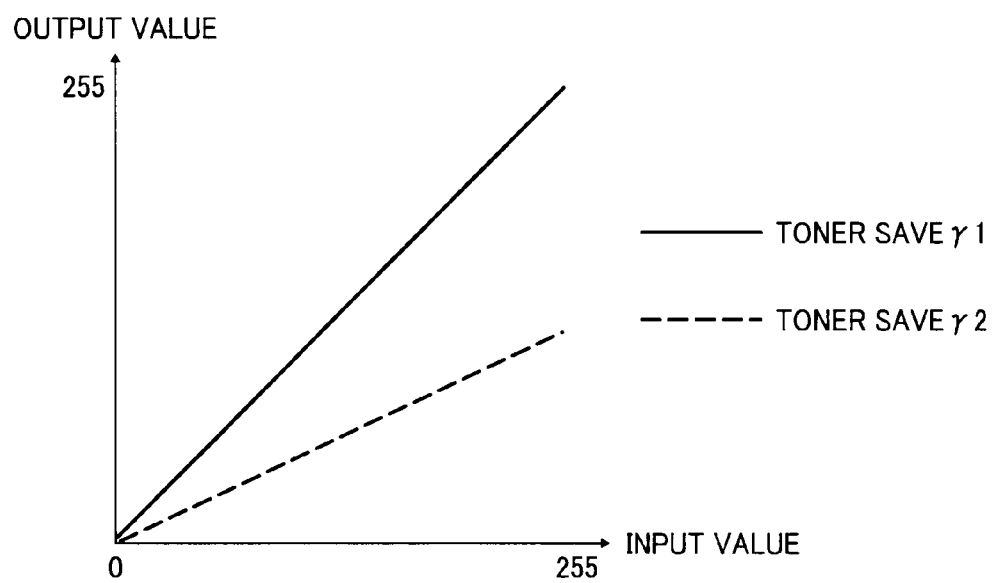
FIG. 17 is a graph illustrating characteristics of two types of γ conversion used in a toner save unit in the image processing unit.

FIG. 17 is a graph illustrating characteristics of two types of γ conversion used for toner saving.

In toner saving, either one of the two types of γ conversion, toner save γ1 and toner save γ2 illustrated in FIG. 17, is selected to perform γ conversion to the C, M, Y, and K signals from the black component generation unit 105. When γ conversion is performed by using the toner save γ1, an input value is identical to an output value so that density of the C, M, Y, and K signals are not changed. In other words, toner saving is not performed in such a case. On the other hand, when γ conversion is performed by using the toner save γ2, the output value is substantially one-half of the input value, so that the density of the C, M, Y, and K signals is reduced.

When "photographic document" is selected as a document type, the toner save γ2 is applied regardless of an edge part and a non-edge part, as shown in Table 1 below, so that the density is evenly reduced to 50%. As a result, images in a halftone dot part and on a printing paper are naturally printed, achieving higher image quality even when the density is reduced.

When either one of the "text/photographic document", the "text document", and the "map document" is selected as a document type, either the toner save γ1 or the toner save γ2 is applied in accordance with the edge determination signal ts as illustrated in Table 2 below. Specifically, the toner save γ1 is applied to an edge part specified by the edge determination signal ts to maintain the density, and the toner save γ2 is applied to a non-edge part to reduce the density. For example, the density of the edge part illustrated in FIG. 16 is maintained while the density of the non-edge part is reduced to 50%. As a result, legibility of the character image is improved while saving toner. Further, because pixels determined as an edge part do not exist in the face image area including a face image, the density of the face image area is evenly reduced to 50%. In other words, the density of the face image area is not locally reduced. Therefore, the density of the face image and an image adjacent to the face image as well as density of a portion such as hair and pupils conventionally detected as an edge part are evenly reduced. As a result, unnatural or odd parts in the face image can be reduced as compared to the case of the related art, in which hair and pupils of a person in the face image area are detected as an edge part to maintain the density of such portions as illustrated in FIG. 15.

TABLE 1

| Edge Detection Result | Type of γ Conversion |
| --- | --- |
| Edge Part | Toner Save γ2 |
| Non-Edge Part | |

TABLE 2

| Edge Detection Result | Type of γ Conversion |
|---|---|
| Edge Part | Toner Save γ1 |
| Non-Edge Part | Toner Save γ2 |

In the first exemplary embodiment, the toner save γ2 is evenly applied to the face image area. Alternatively, unnatural or odd parts in the face image area can be reduced by evenly applying a same toner save γ to the face image area. For example, the toner save γ1 may be evenly applied to the face image area, or a toner save γ which is different from the toner save γ1 and γ2 may be evenly applied to the face image area.

In the first exemplary embodiment, the density of the edge part is maintained. Alternatively, the density of the edge part may be slightly reduced. In such a case, the density of the edge part is higher than that of the non-edge part.

After toner saving is performed as described above, a printer gamma correction unit 107 performs gamma correction by using a density conversion table corresponding to density characteristics of the printer 15. Thereafter, a digital half-toning unit 108 performs digital half-toning, such as dithering and error diffusion, and outputs image data to a control unit of the printer 15.

In the first exemplary embodiment, density conversion using the density conversion table is performed in two steps by the toner save unit 106 and the printer gamma correction unit 107. Alternatively, the density conversion may be integrally performed in one step.

A description is now given of a second exemplary embodiment of the image processing unit 100.

As described above, unnatural or odd parts in the face image can be reduced by evenly reducing the density of the face image area. However, the face image may not be identified when the density of the face image area is reduced too much. Therefore, it is preferable not to reduce the density of the face image area excessively.

Figure 18:
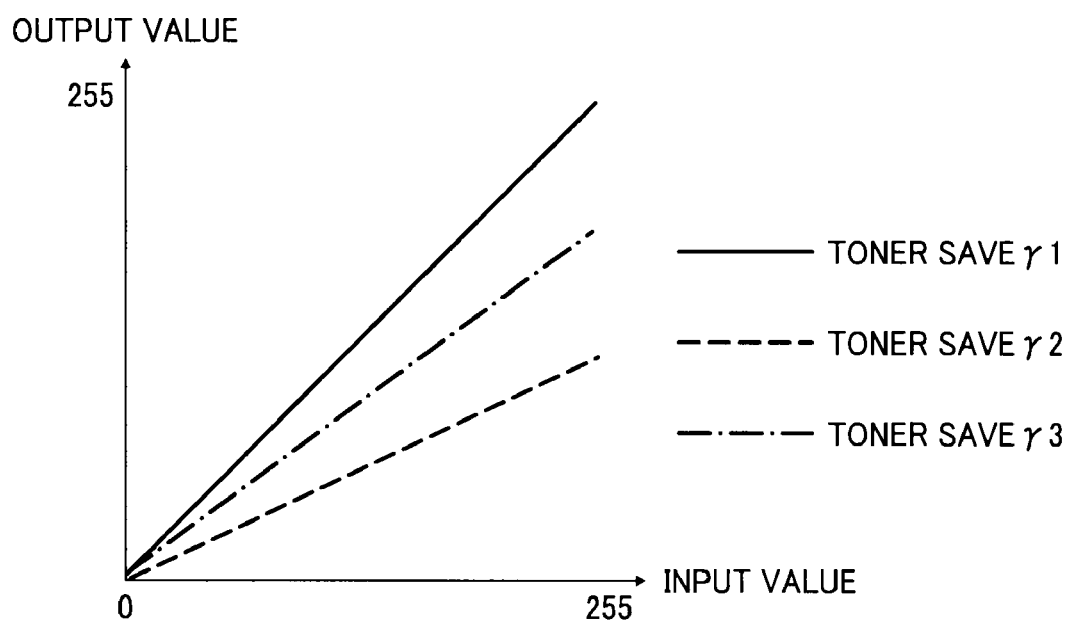
FIG. 18 is a graph illustrating characteristics of three types of γ conversion used in a toner save unit according to a second exemplary embodiment.

In the second exemplary embodiment, in addition to the toner save γ1 and γ2, a toner save γ3 having property intermediate between the toner save γ1 and γ2 as illustrated in FIG. 18 is provided. When either one of the "text/photographic document", the "text document", and the "map document" is selected as a document type, the toner save γ3 is evenly applied to the face image area as illustrated in Table 3 below. With regard to the non-face image area, the toner save γ1 is applied to an edge part and the toner save γ2 is applied to a non-edge part in a similar way as the first exemplary embodiment. As a result, visibility of the output image can be improved in the non-edge part as well as the face image area while saving toner. The rest of the configuration and operations of the image processing unit 100 according to the second exemplary embodiment is the same as that of the image processing unit 100 according to the first exemplary embodiment.

TABLE 3

| Face Image Detection Result | Edge Detection Result | Type of γ Conversion |
|---|---|---|
| Face Image Area | Edge Part Non-Edge Pat | Toner Save γ3 |
| Non-Face Image Area | Edge Part Non-Edge Part | Toner Save γ1 Toner Save γ2 |

A description is now given of a third exemplary embodiment of the image processing unit 100.

The image processing unit 100 according to the third exemplary embodiment has the same configuration as that of the image processing unit 100 according to the first exemplary embodiment illustrated in FIG. 4, except that a specific image detection unit 140 detects a numeric image area as a specific image area instead of detecting the face image area.

Figure 19:
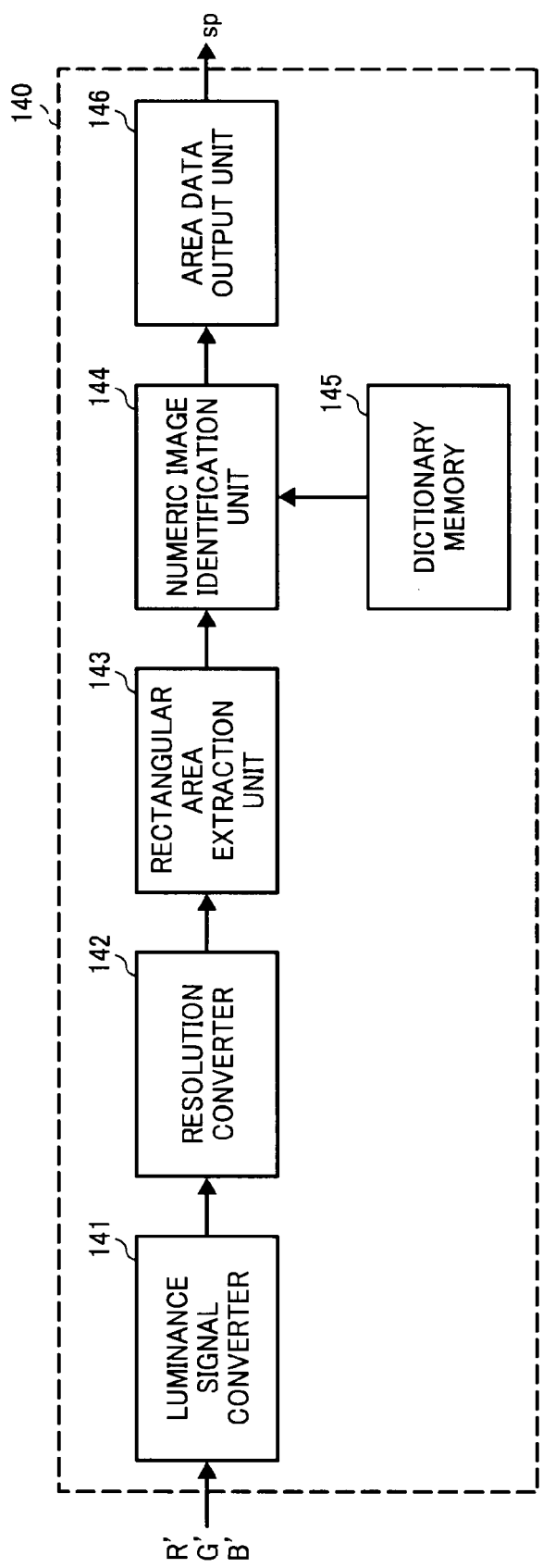
FIG. 19 is a schematic view illustrating a specific image detection unit according to a third exemplary embodiment.

FIG. 19 is a schematic view illustrating the specific image detection unit 140 according to the third exemplary embodiment.

In a similar way as the first exemplary embodiment, the R', G', and B' signals output from the filter unit 103 are converted into luminance signals by a luminance signal converter 141, and resolutions of the luminance signals are converted by a resolution converter 142. Thereafter, a rectangular area extraction unit 143 extracts a rectangular area from the luminance signals of which resolutions are converted, and outputs the rectangular area to a numeric image identification unit 144. The numeric image identification unit 144 refers to characteristic quantity prestored in a dictionary memory 145 to identify whether or not a numeric image is included in the rectangular area. When the numeric image is identified in the rectangular area by the numeric image identification unit 144, an area data output unit 146 outputs an sp signal including rectangular area data such as coordinate data to specify the rectangular area. A series of the processes from extraction of the rectangular area to identification of the numeric image are performed based on known OCR technology.

The sp signal is output to the total determination unit 120 in a similar way as the eg signal. The total determination unit 120 outputs an edge determination signal ts indicating a total determination result based on the eg signal from the edge detection unit 110 and the sp signal from the specific image detection unit 140. Also in the third exemplary embodiment, the total determination unit 120 is configured not to determine the edge part specified by the eg signal from the edge detection unit 110 as an edge part in the numeric image area specified by the sp signal from the specific image detection unit 140. Specifically, pixels in the numeric image area are not determined as an edge part even when the pixels are detected as an edge part by the edge detection unit 110. The edge determination signal ts thus determined by the total determination unit 120 is output to the toner save unit 106.

Similarly to the first exemplary embodiment, two types of γ conversion, toner save γ1 and toner save γ2 illustrated in FIG. 17, are used in toner saving according to the third exemplary embodiment. A toner save mode applied when any one of the "text/photographic document", the "text document", and the "map document" is selected as a document type is shown in Table 4 below. Specifically, the toner save γ1 is evenly applied to the numeric image area so as to maintain the density. On the other hand, with regard to a non-numeric image area, the toner save γ1 is applied to the edge part and the toner save γ2 is applied to the non-edge part in a similar way as the first exemplary embodiment. As a result, the edge part as well as the numeric image area have higher density, thereby improving legibility of the numeric image.

TABLE 4

| Numeric Image Detection Result | Edge Detection Result | Type of γ Conversion |
|---|---|---|
| Numeric Image Area | Edge Part Non-Edge Part | Toner Save γ1 |

TABLE 4-continued

| Numeric Image Detection Result | Edge Detection Result | Type of γ Conversion |
|---|---|---|
| Non-Numeric Image Area | Edge Part Non-Edge Part | Toner Save γ1 Toner Save γ2 |

A description is now given of a fourth exemplary embodiment of the image processing unit 100.

FIG. 20 is a flow chart illustrating a flow of software processing performed in the image processing unit 100 according to a fourth exemplary embodiment. Specifically, FIG. 20 illustrates an example of a case in which a series of processes performed by the edge detection unit 110, the total determination unit 120, the specific image detection unit 130, and the toner save unit 106 according to the first and second exemplary embodiments is performed by software. It should be noted that only main processes of the present invention are illustrated in the flow chart in FIG. 20, with subsidiary processes omitted.

In the fourth exemplary embodiment, a control unit including a CPU and so forth such as a processor and a memory provided in the image processing unit 100 runs an image processing program stored in a program memory such as a ROM to perform the following processes. First, at S1, the C', M', and Y' signals output from the printer color correction unit 104 are input into the control unit. At S2, the control unit detects an edge part based on the C', M', and Y' signals, and stores edge data indicating the edge part and a non-edge part for each pixel to an image memory. Subsequently, at S3, a face image area (a specific image area) including a face image is detected based on the C', M', and Y' signals. Specifically, when an area is detected as the face image area based on the C', M', and Y' signals, coordinate data indicating a rectangular area defined by a starting point and an end point, or binary property data indicating whether or not the area is a face image area by pixel, is stored as area data indicating the face image area to another image memory different from the above-described image memory.

Next, a type of γ conversion to be applied is selected by referring to the result of edge detection (S2) stored in the image memory and the result of face image area detection (S3) to perform toner saving to the C', M', and Y' signals. More specifically, at S4, a determination is made as to whether or not the pixel to be processed belongs to the face image area based on the detection result of the face image area (S3). When the pixel to be processed is determined to belong to the face image area, at S5, toner saving is performed by applying the toner save γ2 illustrated in FIG. 17 to save toner consumption by reducing the density. By contrast, when the pixel to be processed is determined not to belong to the face image area, at S6, determination whether or not the pixel belongs to an edge part is performed based on the result of edge detection (S2). When the pixel is determined as an edge part, at S7, the toner save γ1 illustrated in FIG. 17 is applied to perform toner saving by maintaining the density. On the other hand, when the pixel is determined as a non-edge part, at S8, the toner save γ2 illustrated in FIG. 17 is applied to reduce toner consumption by reducing the density.

According to the fourth exemplary embodiment, density of the entire face image area can be evenly reduced so that unnatural or odd parts in the face image can be reduced in a similar way as the first exemplary embodiment. With regard to the non-face image area, the density of the non-edge part is reduced while maintaining the density of the edge part, thereby improving legibility of the character image.

In the fourth exemplary embodiment, the toner save γ2 is applied to the face image area in the similar way as the first exemplary embodiment. Alternatively, the toner save γ3 illustrated in FIG. 18 may be applied to the face image area in the similar way as the second exemplary embodiment.

In the fourth exemplary embodiment, improvement in visibility of the face image in the non-edge part is described. Processes similar to those described above in the fourth exemplary embodiment are performed in order to improve legibility of the numeric image as in the case of the third exemplary embodiment.

In the fourth exemplary embodiment, although a part of the configuration according to the first exemplary embodiment is implemented by software, the rest of the configuration according to the first exemplary embodiment may be also implemented by software.

As described above, the image forming apparatus 1000 according to the foregoing exemplary embodiments includes the image processing unit 100 and the printer 15 serving as an image forming unit configured to form an image on the transfer sheet S using an image forming material such as toner based on an image signal processed by the image processing unit 100. The image processing unit 100 according to the first, second, and fourth exemplary embodiments includes the scanner gamma correction unit 101 configured to receive the image signals (R, G, and B signals) of the original document to be processed; an edge detection unit 110 configured to detect a non-edge part which satisfies predetermined requirements in the original document based on the image signal received by the scanner gamma correction unit 101 to reduce the density of the non-edge part; the specific image detection unit 130 configured to detect a face image area which satisfies predetermined requirements in the original document based on the image signal received by the scanner gamma correction unit 101; and the total determination unit 120 and the toner save unit 106 configured to perform toner saving to the non-face image area detected by the specific image detection unit 130 to reduce the density of the non-edge part detected by the edge detection unit 110, and not to perform toner saving to the non-edge part included in the face image area. As a result, the density of the face image area is not partially reduced, thereby reducing unnatural or odd parts in the output image. Further, with regard to the non-face image area, the density of the non-edge part is reduced while maintaining the density of the edge part, thereby improving legibility of the character image while reducing toner consumption.

Particularly, according to the first, second, and fourth exemplary embodiments, the area detected by the edge detection unit 110 to reduce the density thereof is the non-edge part of the original document, so that the density of the non-edge part is relatively reduced while keeping the density of the edge part relatively high in the non-face image area. Accordingly, legibility of the character image can be improved while reducing toner consumption. When the density of the non-face image area is partially reduced for the purpose of achieving another effects, the face image area is not affected by such process so that unnatural or odd parts in the output image can be reduced.

Moreover, according to the first, second, and forth exemplary embodiments, the face image area which may include unnatural or odds parts when the density thereof is partially reduced is detected as a specific image area by the specific image detection unit 130. Accordingly, unnatural or odd parts in the output image can be effectively reduced.

In the first, second, and fourth exemplary embodiments, the toner save unit 106 performs toner saving to evenly reduce the density of the face image area detected by the specific image detection unit 130. Alternatively, the density of the face image area may be maintained without performing toner saving to reduce the density thereof. In such a case, visibility of the face image can be more highly improved.

According to the second exemplary embodiment, the toner save unit 106 performs toner saving to evenly reduce the density of the entire face image area detected by the specific image detection unit 130 with a lower reduction rate as compared to a reduction rate for the density of the non-face image area. Accordingly, visibility of the face image in the output image can be highly improved while reducing toner consumption.

The image processing unit 100 according to the third exemplary embodiment includes the scanner gamma correction unit 101 configured to receive the image signals (R, G, and B signals) of the original document to be processed; the edge detection unit 110 configured to detect the edge part which satisfies predetermined requirements in the original document based on the image signals received by the scanner gamma correction unit 101; the specific image detection unit 140 configured to detect a numeric image area which satisfies predetermined requirements in the original document as a specific image area based on the image signals received by the scanner gamma correction unit 101; and the total determination unit 120 and the toner save unit 106 configured to perform toner saving to the non-numeric image area detected by the specific image detection unit 140 so as to reduce the density of the non-edge part detected by the edge detection unit 110, and perform toner saving to the numeric image area such that the density of the numeric image area is evenly kept higher than the density of the non-edge part of the non-numeric image area. Such a configuration allows the specific image detection unit 140 to recognize small numerical images of which outlines are hardly detected as an edge part by the edge detection unit 110 and numerical images with a lower contrast with adjacent images. As a result, the numerical images detected by the specific image detection unit 140 can evenly have relatively high density. Therefore, legibility of the small numerical images and the numerical images with a lower contrast with the adjacent images can be improved. Not only legibility of the numerical images described above but also legibility of small character image and character images with a lower contrast with adjacent images can be improved by allowing the specific image detection unit 140 to recognize such character images.

Although the foregoing exemplary embodiments are applied to the image forming apparatus using electrophotography to reduce toner consumption in the description above, the foregoing exemplary embodiments may also be applied to an inkjet image forming apparatus using an image forming material other than toner.

Elements and/or features of different exemplary embodiments may be combined with each other and/or substituted for each other within the scope of this disclosure and appended claims.

Example embodiments being thus described, it will be apparent that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. An image processing device, comprising:
an image signal reception unit configured to receive an image signal of an image to be processed, said image including a photographic image area that includes a face image area;
a determination unit configured to determine edges in the image except in the face image area;
a density reduction area detector configured to detect a density reduction area that is a non-edge portion of the image that is not included in the face image area;
an image area detector configured to detect the face image area in the image; and
a density controller configured to reduce density of the density reduction area that is the non-edge portion of the image that is not part of the face image area detected by the density reduction area detector, maintain a density of the face image area detected by the image area detector, and maintain a density of the edges of the image that are not part of the face image area.

2. The image processing device according to claim 1, wherein the image area detector is further configured to detect a numeric image area in the image.

3. An image processing device, comprising:
an image signal reception unit configured to receive an image signal of an image to be processed, said image including a photographic image area that includes a face image area;
a determination unit configured to determine edges in the image except in the face image area;
a density reduction area detector configured to detect a density reduction area that is a non-edge portion of the image that is not included in the face image area;
an image area detector configured to detect the face image area in the image; and
a density controller configured to reduce density of the density reduction area that is the non-edge portion of the image that is not part of the face image area detected by the density reduction area detector, and to evenly reduce density of the face image area at a lower reduction rate than a reduction rate for the density reduction area.

4. An image forming apparatus, comprising:
the image processing device according to claim 1; and
an image forming device configured to form an image on a recording material using an image forming material based on an image signal processed by the image processing device.

5. A non-transitory computer readable storage medium encoded with instructions which when executed by a computer causes the computer to perform an image processing method comprising:
receiving an image signal of an image to be processed, said image including a photovoltaic image area that includes a face image area;
determining edges in the image except in the face image area;
detecting a density reduction area that is a non-edge portion of the image that is not included in the face image area;

detecting the face image area in the image; and reducing density of the density reduction area that is the non-edge portion of the image that is not part of the face image area detected in the detecting the density reduction area, while maintaining a density of the face image area and maintaining a density of the edges of the image that are not part of the face image area.

6. The image processing device according to claim 2, wherein the density controller is further configured to maintain a density of the numeric image area detected by the image area detector.

7. The non-transitory computer readable storage medium according to claim 5, wherein the method further comprises:
   detecting a numeric image area in the image.

8. The non-transitory computer readable storage medium according to claim 7, wherein the method further comprises:
   maintaining a density of the numeric image area.

* * * * *